United States Patent
Okamoto

(10) Patent No.: US 6,917,185 B2
(45) Date of Patent: Jul. 12, 2005

(54) CONVERTER DEVICE HAVING POWER FACTOR IMPROVING CIRCUIT

(75) Inventor: Kazuaki Okamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/647,299

(22) Filed: Aug. 26, 2003

(65) Prior Publication Data

US 2004/0178784 A1 Sep. 16, 2004

(30) Foreign Application Priority Data

Mar. 10, 2003 (JP) ........................................ 2003-063093

(51) Int. Cl.$^7$ ............................. G05F 1/10; G05F 5/00
(52) U.S. Cl. ........................ 323/241; 323/246; 323/283; 323/300
(58) Field of Search ................................ 323/241, 246, 323/275, 283, 284, 285, 300, 350, 351

(56) References Cited

U.S. PATENT DOCUMENTS 5,932,938 A * 8/1999 Shimamori .................. 323/241
6,037,757 A * 3/2000 Oliveira et al. .............. 323/241

FOREIGN PATENT DOCUMENTS

| JP | 07-213066 | 8/1995 |
| JP | 09-252578 | 9/1997 |
| JP | 2001-045763 | 2/2001 |
| JP | 2001-238452 | 8/2001 |

* cited by examiner

Primary Examiner—Jessica Han
(74) Attorney, Agent, or Firm—Oblon, Spivak, McClelland, Maier & Neustadt, P.C.

(57) ABSTRACT

A converter device is provided which has a power factor improving circuit that removes effects of noise superimposed on an AC power supply and reduces higher harmonics and improves the power factor. A power factor improving circuit (103) generally includes a voltage error amplifier (8), a current error amplifier (10), a comparator (11), a triangular wave oscillator (12), an output buffer (13), and a DC power supply (PS). A power factor improving unit (102) has a photocoupler (14) for detecting an output of an AC power supply (1) and a microcomputer (15), where the output (Vp) of the photocoupler (14) is given to the MCU of the microcomputer (15). A D/A converter (17) in the microcomputer (15) gives a converter output (DAO) to the power factor improving circuit (103) and the power factor improving circuit (103) gives a reference voltage (VREF) to the D/A converter (17).

18 Claims, 17 Drawing Sheets

FIG. 3
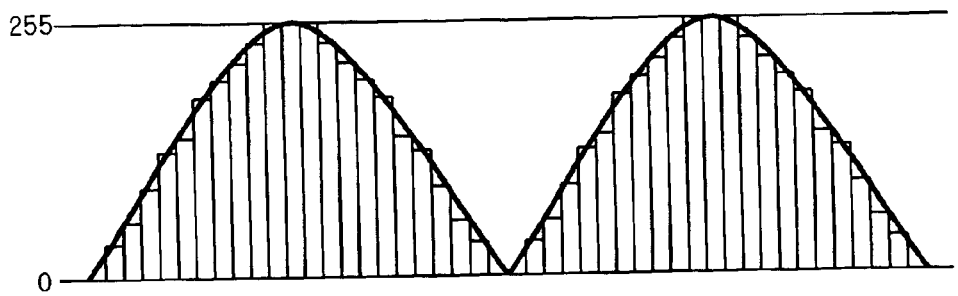
FIG. 4
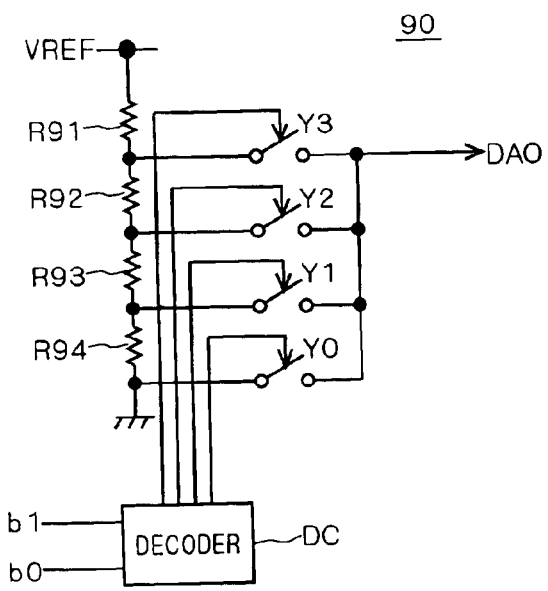
FIG. 5
| b 0 | b 1 | DECIMAL NUMBER | DAO |
|---|---|---|---|
| 0 | 0 | 0 | 0 |
| 1 | 0 | 1 | (1/4) VREF |
| 0 | 1 | 2 | (2/4) VREF |
| 1 | 1 | 3 | (3/4) VREF |

FIG. 17

| ROM ADDRESS | K 1 |
|---|---|
| 0 | 0 |
| 1 | 0 |
| 2 | 1 |
| 3 | 1 |
| 4 | 2 |
| 5 | 2 |
| 6 | 3 |
| 7 | 3 |
| ... | ... |

F I G. 1 9

| | BINARY | | | | | | | | DECIMAL |
|---|---|---|---|---|---|---|---|---|---|
| | MSB | | | | | | | LSB | |
| ORIGINAL DATA | 0 | 1 | 1 | 1 | 0 | 0 | 0 | 0 | → 112 |
| 1-BIT RIGHT-SHIFT | 0 | 0 | 1 | 1 | 1 | 0 | 0 | 0 | → 56 |
| 2-BIT RIGHT-SHIFT | 0 | 0 | 0 | 1 | 1 | 1 | 0 | 0 | → 28 |

CONVERTER DEVICE HAVING POWER FACTOR IMPROVING CIRCUIT

BACKGROUND OF THE INVENTION

1. Field of the Invention

The present invention relates to a converter device for converting AC power into DC power, and particularly to a converter device having a power factor improving circuit for improving the power factor.

2. Description of the Background Art

Conventional AC/DC converters for converting AC power to DC power use harmonic current reducing circuits in order to improve the power factor and to reduce higher harmonic current, such as that shown in Japanese Patent Application Laid-Open No. 9-252578 (1997: Columns 5–9, FIGS. 1–10).

In the harmonic current reducing circuit described in Patent Document shown above, an output voltage from a rectifier circuit is resistance-divided and applied to the harmonic current reducing circuit as a detect input voltage. Therefore, noise superimposed on the AC power supply affects the operation of the harmonic current reducing circuit and so affects the improvement of the power factor and the reduction of harmonic current.

SUMMARY OF THE INVENTION

An object of the invention is to provide a converter device having a power factor improving circuit that removes effects of noise superimposed on an AC power supply and reduces higher harmonics and improves the power factor.

According to the present invention, a converter device has an A/D converter unit for converting AC power to DC power and a power factor improving unit for improving the power factor of the A/D converter unit. The power factor improving unit includes a photocoupler, a computer system, a D/A converter, and a current control portion. The photocoupler converts an AC power-supply waveform given to the A/D converter unit into a digital signal and outputs the digital signal. On the basis of the digital signal, the computer system generates full-wave rectification waveform data synchronized with the AC power-supply waveform. The D/A converter receives as a reference voltage a voltage error signal based on a voltage error between a predetermined set voltage and an output voltage of the A/D converter unit, and multiplies together the reference voltage and the full-wave rectification waveform data to output a target current value waveform similar to the waveform of an input voltage in the A/D converter unit. The current control portion compares the target current value waveform and the waveform of a current flowing in the A/D converter unit and controls the current flowing in the A/D converter unit to reduce the current error between the two.

According to this converter device, the D/A converter outputs a target current value waveform similar to the waveform of an input voltage in the A/D converter unit and the current control portion compares the target current value waveform and the waveform of a current flowing in the A/D converter unit and controls the current flowing in the A/D converter unit to reduce the current error between the two. This provides a higher power factor improving effect. Also, the photocoupler converts the AC power-supply waveform of the A/D converter unit into a digital signal and the computer system generates full-wave rectification waveform data synchronized with the AC power-supply waveform on the basis of the digital signal, and the D/A converter generates a target current value waveform on the basis of the full-wave rectification waveform data and a voltage error signal. Therefore the target current value does not include noise superimposed on the AC power supply. This provides a harmonic reducing effect and a higher power factor improving effect.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram used to describe the operation of the D/A converter;

FIG. 4 is a diagram used to describe the multiplying function of the D/A converter;

FIG. 5 is a diagram used to describe the configuration of the D/A converter;

FIG. 17 is a diagram used to describe the operation of the converter device of the first modification of the third preferred embodiment of the invention;

FIG. 19 is a diagram used to describe the operation of the converter device of the second modification of the third preferred embodiment of the invention.

DESCRIPTION OF THE PREFERRED EMBODIMENTS

A. First Preferred Embodiment

A-1. Configuration of the Device

Figure 1:
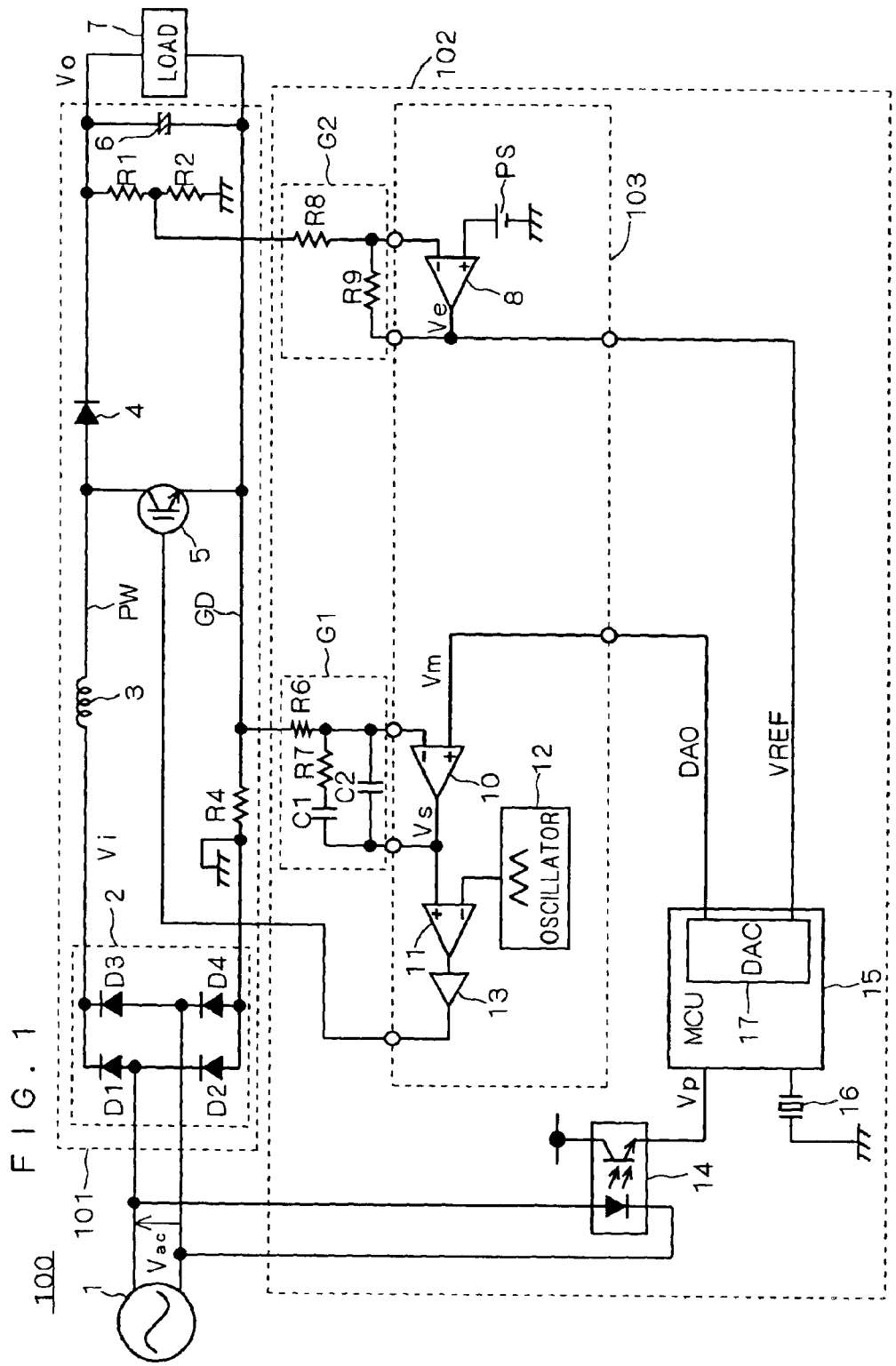
FIG. 1 is a diagram showing the configuration of a converter device according to a first preferred embodiment of the invention.

FIG. 1 shows the configuration of a converter device 100 according to a first preferred embodiment of the invention. As shown in FIG. 1, the converter device 100 includes an A/D converter unit 101 for converting AC power supplied from an AC power supply 1 into DC power and applying it to a load 7, and a power factor improving unit 102 having a power factor improving circuit 103.

In the A/D converter unit 101, the AC power from the AC power supply 1 is first given to a full-wave rectification diode bridge 2. The full-wave rectification diode bridge 2 includes diodes D1, D2, D3 and D4, whose cathode output is connected to a first output line PW and whose anode output is connected to a second output line GD.

On the first output line PW, a boosting coil 3 and a commutation diode 4 are interposed in this order from the side of the full-wave rectification diode bridge 2, where the cathode of the commutation diode 4 is connected to the load 7. A resistor R4 is interposed on the second output line GD and connected to the load 7. The second output line GD is grounded between the resistor R4 and the full-wave rectification diode bridge 2.

A switching device 5, e.g. an IGBT (Insulated Gate Bipolar Transistor), is connected between the anode of the commutation diode 4 and the end of the resistor R4 that is located closer to the load 7, and series-connected resistors R1 and R2 are connected between the cathode of the commutation diode 4 and ground. Also, a smoothing capacitor 6 is connected between the cathode of the commutation diode 4 and the second output line GD that is located closer to the load 7 than to the resistors R1 and R2.

The power factor improving circuit 103 generally includes a voltage error amplifier 8 (a voltage error signal generating portion), a current error amplifier 10, a comparator 11, a triangular wave oscillator 12, an output buffer 13, and a DC power supply PS.

A gain setting portion G1 and a gain setting portion G2 are electrically connected between the A/D converter unit 101 and the power factor improving circuit 103; the gain setting portion G1 sets the gain of the current error amplifier 10 and the gain setting portion G2 sets the gain of the voltage error amplifier 8.

The power factor improving unit 102 includes a photocoupler 14 for detecting the output of the AC power supply 1 and also includes a microcomputer 15 (a computer system), where an output Vp from the photocoupler 14 is given to the MCU (Memory Control Unit) of the microcomputer 15. A converter output DAO from a D/A converter 17 in the microcomputer 15 is given to the power factor improving circuit 103, while a reference voltage VREF from the power factor improving circuit 103 is given to the D/A converter 17. A reference clock signal source 16 is connected to the microcomputer 15.

In the power factor improving circuit 103, the output of the current error amplifier 10 is connected to the plus input of the comparator 11 and the output of the triangular wave oscillator 12 is given to the minus input of the comparator 11. The output of the comparator 11 is given to the control terminal of the switching device 5. The plus input of the current error amplifier 10 receives the converter output DAO from the D/A converter 17 in the microcomputer 15.

The gain setting portion G1 includes: a resistor R6 having its first end connected to the load-side end of the resistor R4 of the A/D converter unit 101 and its second end connected to the minus input of the current error amplifier 10; a resistor R7 and a capacitor C1 series-connected between the second end of the resistor R6 and the output of the current error amplifier 10; and a capacitor C2 connected between the second end of the resistor R6 and the output of the current error amplifier 10.

The plus input of the voltage error amplifier 8 receives a positive voltage from the DC power supply PS, while the output of the voltage error amplifier 8 is given as the reference voltage VREF to the D/A converter 17 in the microcomputer 15.

The gain setting portion G2 has a resistor R8 having its first end connected to a connection node between the resistors R1 and R2 in the A/D converter unit 101 and its second end connected to the minus input of the voltage error amplifier 8, and a resistor R9 connected between the second end of the resistor R8 and the output of the voltage error amplifier 8.

A-2. Operation

Next, operation of the converter device 100 is described referring to FIGS. 2 to 5 together with FIG. 1.

The A/D converter unit 101 is a boost-type AC/DC converter that boosts voltage by exciting magnetic field energy at the boosting coil 3 through on/off operation of the switching device 5.

That is to say, when the switching device 5 turns on, a current flows from the boosting coil 3 to the switching device 5 and electromagnetic energy is accumulated at the boosting coil 3. At this time the commutation diode 4 does not conduct and a current is supplied to the load 7 from the smoothing capacitor 6.

On the other hand, when the switching device 5 turns off, then the current flowing to the boosting coil 3 suddenly disappears, which produces a counterelectromotive force at both ends of the boosting coil 3. Then the anode-side voltage of the commutation diode 4 becomes higher than the cathode-side voltage or the voltage at the smoothing capacitor 6, so that the commutation diode 4 becomes conductive, and charges the smoothing capacitor 6 and supplies current to the load 7.

Thus, the A/D converter unit 101 is capable of generating a voltage higher than the input voltage by turning on/off the current flowing to the boosting coil 3. Since the output voltage Vo keeps rising when the switching device 5 is just turned on/off, feedback is applied using the voltage error amplifier 8 so that a given voltage value is maintained.

The voltage error amplifier 8 is an inverting amplifier which receives as its input voltage the voltage resistance-divided by the resistors R4 and R5; it inversely amplifies an error between a set voltage and the actual output voltage Vo. That is to say, when the load 7 becomes lighter and the output voltage Vo will rise over the set voltage, the voltage error amplifier 8 operates to lower its output; when the load 7 becomes heavier and the output voltage Vo will decrease below the set voltage, the voltage error amplifier 8 operates to increase its output.

A-2-1. Power Factor Improving Effect

Figure 2:
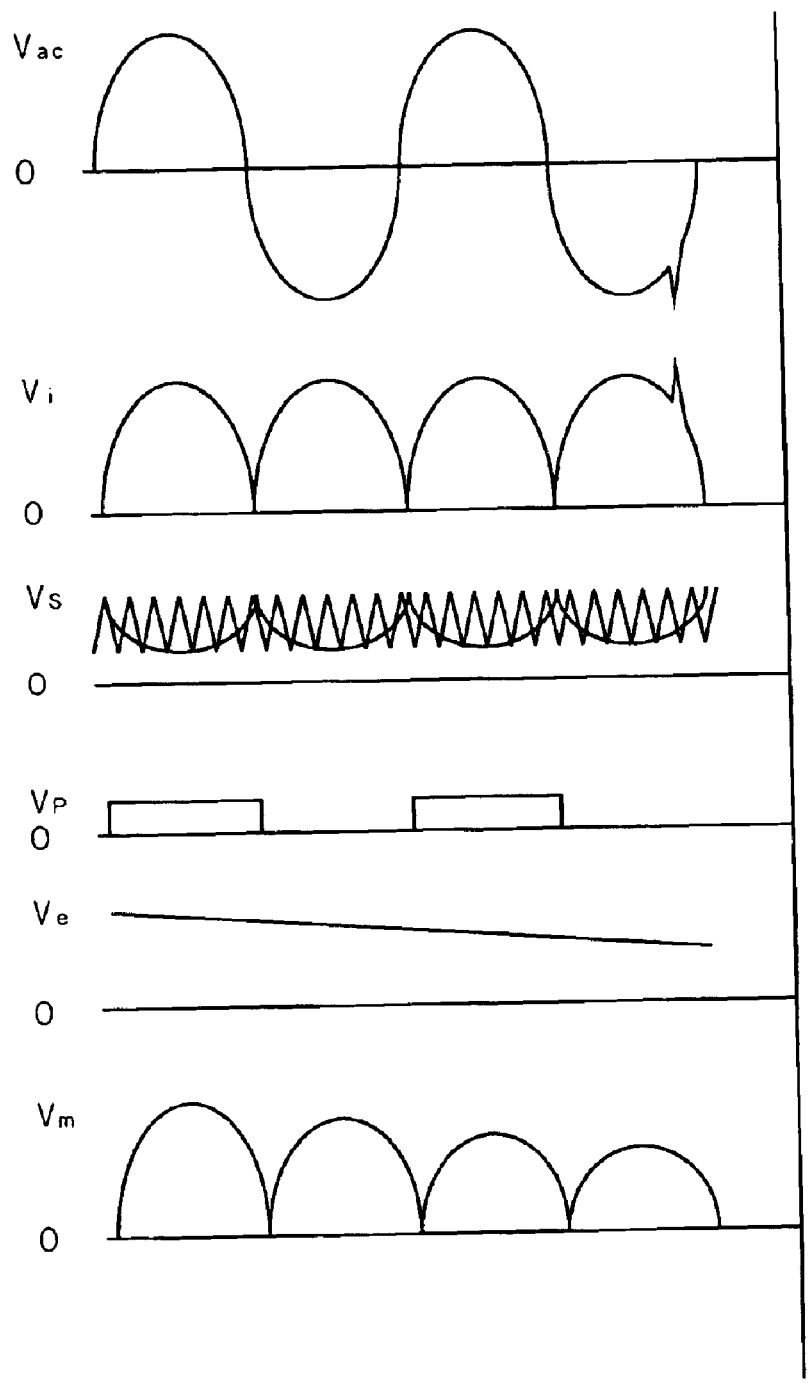
FIG. 2 is a diagram used to describe the operation of the converter device of the first preferred embodiment of the invention.

Next, before describing operation of the current error amplifier 10, the mechanism for improving the power factor is described referring to FIG. 2.

In an electric circuit whose input is AC power, when a phase difference between current and voltage is taken as θ, then the power P inputted to this electric circuit is given as: P=V·I·cos θ, where the constant of proportion, cos θ, is referred to as a power factor. When the power P required by the electric circuit is constant, and the power-supply voltage V is constant, then the peak value of current I can be smaller as the power factor (cos θ) becomes larger (becomes closer to 1).

In capacitor-input-type electric circuits, such as AC/DC converters, the current flowing in the circuit exhibits a protruding waveform where the peak value reaches 5 to 10 times the effective value. Now, as shown in FIG. 2, the power-supply voltage Vac of the AC power supply 1, which is a commercial power supply, includes many harmonic components. Such harmonic components are included also in the waveform of the full-wave-rectified input voltage Vi, which causes noise.

Improving the power factor in a capacitor-input-type electric circuit requires placing the current flowing in the circuit and the input voltage in phase and lowering the peak current value.

Thus, in the converter device 100, in order to cause the current flowing in the D/A converter unit 101 and the input voltage Vi to be in phase, the current waveform is controlled to form a sine wave similar to the input voltage waveform. The current error amplifier 10 is used for this purpose.

The current error amplifier 10 obtains an error between a target current value (a current value providing a target current value waveform similar to the input voltage waveform) and the current actually flowing in the circuit, and controls the switching device 5 on the basis of the current error.

In typical AC/DC converters, the current error becomes largest at valleys of the full-wave-rectified waveform and becomes smallest at its peaks.

FIG. 2 shows together the waveform of the input voltage Vi or the full-wave-rectified voltage, and the waveform of the output voltage Vs of the current error amplifier 10. Note that, in FIG. 2, the output waveform of the triangular wave oscillator 12 is superimposed on the output waveform of the current error amplifier 10.

In FIG. 2, the output waveform (Vs) of the current error amplifier 10 is like an inversion of the full-wave-rectified waveform, where the current error becomes largest at valleys of the full-wave-rectified waveform and becomes smallest at its peaks.

Thus, while the current error is larger, the on-state period of the switching device 5 is set longer to increase the current flowing in the circuit, and while the current error is smaller, the on-state period of the switching device 5 is set shorter to reduce the current flowing in the circuit.

More specifically, the output of the current error amplifier 10 and the output of the triangular wave oscillator 12 are inputted to the comparator 11, where the two are compared in level. Then the switching device 5 is PWM (Pulse Width Modulation) controlled, where, while the two levels are different, i.e. while the current error is smaller, the width of the output pulse of the comparator 11 is set smaller, and while the two levels have no difference, i.e. while the current error is larger, the width of the output pulse of the comparator 11 is set larger. The current error amplifier 10, comparator 11, triangular wave oscillator 12 and output buffer 13 may together be referred to as a current control portion, since they control the switching device 5 to control the current flowing in the A/D converter unit 101.

The operation shown above causes the current flowing in the A/D converter unit 101 to form a sine waveform similar to the waveform of the input voltage (Vi). They are thus placed in phase and the power factor is improved.

A-2-2. Harmonic Reducing Effect

Also, the current actually flowing in the A/D converter unit 101 is detected as a voltage generated at the resistor R4 and given to the current error amplifier 10, and the current error amplifier 10 compares it with a target current value or the output voltage DAO from the D/A converter 17 to obtain a current error. This provides an effect of reducing harmonics and offers a higher power factor improving effect.

That is to say, as shown in FIG. 2, the power-supply voltage Vac outputted from the AC power supply 1 contains a large number of harmonic components. When the power-supply voltage Vac is just full-wave rectified, the harmonic components are included in the waveform of the full-wave-rectified input voltage Vi. However, since the power-supply voltage Vac is given to the photocoupler 14 and the photocoupler 14 provides digital signal Vp that is synchronized with the cycle of the AC power supply 1, the harmonic components superimposed on the input AC signal, i.e. noise, are rejected.

The photocoupler 14 is a device that is formed of a combination of a light-emitting diode and a light-receiving element such as a phototransistor, where the light-emitting diode converts an electric signal to a light signal and the light-receiving element receives it and converts it back to an electric signal. Suppose an AC signal is applied to the light-emitting diode. Then, with a positive signal of the AC signal, or at a peak portion of the sine wave, the light-emitting diode conducts and emits light, so that the phototransistor outputs an electric signal at a high level. With a negative signal of the AC signal, or at a valley portion of the sine wave, the light-emitting diode does not conduct and emits no light, so that the phototransistor outputs an electric signal at a low level.

Harmonic components superimposed on the input AC signal, i.e. noise, are thus rejected, and do not appear in the digital signal Vp outputted from the photocoupler 14.

The microcomputer 15 generates n-bit full-wave rectification waveform data that is synchronized with the digital signal Vp from the photocoupler 14 and outputs it to the internal D/A converter 17.

This operation is now described referring to FIG. 3. For the sake of simplicity, it is assumed here that 8-bit full-wave rectification waveform data is generated. As shown in FIG. 3, the lowest level of the full-wave rectification waveform is taken as "0" and the peak level is taken as 255, and then a collection of digital data representing instantaneous amplitude values with numbers from 0 to 255 forms a 8-bit full-wave rectification waveform.

Such digital data is sequentially inputted to the D/A converter 17, and then the D/A converter 17 sequentially outputs analog value corresponding to the digital signal, thereby providing an analog full-wave rectification waveform.

The period of the full-wave rectification waveform can be controlled by adjusting the time intervals at which the digital data is inputted to the D/A converter 17. For example, one period of the full-wave rectification waveform data shown in FIG. 3 is formed of 46 pieces of digital data. Then, when the AC power supply 1 is of 60 Hz, 1 period corresponds to 16.6 msec, and the digital data is inputted to the D/A converter 17 at intervals of 16.6/46=0.361 msec to obtain a 60-Hz full-wave rectification waveform output.

When the D/A converter 17 converts digital data into analog value, it utilizes, as reference voltage VREF, the voltage error signal Ve outputted from the voltage error amplifier 8, so as to provide a target current value waveform.

That is to say, D/A converters, which generally have a function of converting digital data to analog data, provide analog data by multiplying a reference voltage (analog value) and digital data.

This operation is now described referring to FIGS. 4 and 5. For the sake of simplicity, a D/A converter 90 for converting 2-bit digital data into analog value is described as an example. As shown in FIG. 4, the D/A converter 90 provides an output by resistance-dividing the reference voltage VREF with four resistors R91, R92, R93 and R94 that are series-connected in order of decreasing voltage. That is to say, the connection node between the resistors R91 and R92 is connectable to the output terminal of the D/A converter 90 through a switch Y3, the connection node between the resistors R92 and R93 is connectable to the output terminal of the D/A converter 90 through a switch Y2, the connection node between the resistors R93 and R94 is connectable to the output terminal of the D/A converter 90 through a switch Y1, and the connection node between the resistor R94 and ground is connectable to the output terminal of the D/A converter 90 through a switch Y0. When one of the switches Y0 to Y3 is turned on, the resistance-divided value of the reference voltage VREF which corresponds to that switch is outputted as converter output DAO. The switches Y0 to Y3 are on/off controlled according to the combination of digital data b0 and b1. The digital data b0 and b1 is given to a decoder DC and converted to a signal for controlling switches Y0 to Y3.

FIG. 5 is a table showing analog values of the converter output DAO associated with combinations of digital data b0 and b1. As shown in FIG. 5, when b0 and b1 are both 0 (0 in decimal notation), the switch Y0 turns on and converter output DAO is 0 V. When b0 is 1 and b1 is 0 (1 in decimal notation), the switch Y1 turns on and converter output DAO is (1/4)VREF. When b0 is 0 and b1 is 1 (2 in decimal notation), the switch Y2 turns on and converter output DAO is (2/4)VREF. When b0 and b1 are both 1 (3 in decimal notation), the switch Y3 turns on and converter output DAO is (3/4)VREF.

Now, while the D/A converter 17 is used to obtain a target current value waveform, the amplitude of the target current value waveform varies according to variation of the load 7. The D/A converter 17 therefore utilizes, as reference voltage VREF, the voltage error signal Ve outputted from the voltage error amplifier 8 in order to obtain an accurate target current value waveform.

As shown in FIG. 2, the voltage error signal Ve outputted from the voltage error amplifier 8 decreases with time, as the load 7 varies, and the peak value of the target current value waveform obtained by using the voltage error signal Ve as reference voltage VREF, i.e. the waveform of the converter output voltage Vm, too, decreases with time.

As shown in FIG. 2, noise superimposed on the AC power supply, which will appear in the waveform of input voltage Vi, is absent in the waveform of the converter output voltage Vm (target current value waveform). A harmonic reducing effect is thus obtained.

A-3. Effects

As has been described so far, the power factor improving unit 102 in the converter device 100 detects the current flowing in the A/D converter unit 101 as a voltage generated at the resistor R4 and gives it to the current error amplifier 10, and the current error amplifier 10 compares it with a target current value or the output voltage DAO from the D/A converter 17 to obtain a current error. This provides a higher power factor improving effect and a higher harmonic reducing effect.

Also, the power-supply voltage Vac from the AC power supply 1 is given to the photocoupler 14 and the D/A converter 17 generates a target current value waveform on the basis of the digital signal Vp from which harmonic components have been rejected. Therefore the target current value does not contain noise superimposed on the AC power supply, which provides a harmonic reducing effect and a higher power factor improving effect.

Furthermore, since the microcomputer 15 and D/A converter 17 are provided outside the power factor improving circuit 103, the power factor improving circuit 103 can be small in size.

Also, using the D/A converter 17 provided inside the microcomputer 15 lowers cost.

A-4. First Modification

In the power factor improving unit 102 of the converter device 100 described above, the D/A converter 17 provided inside the microcomputer 15 dynamically varies the reference voltage VREF by resistance-dividing and multiplies it by digital data to generate a target current value waveform (analog value). However, as stated earlier, the voltage error signal Ve used as the reference voltage VREF, or the output from the voltage error amplifier 8, may decrease with time as the load 7 varies. Therefore the D/A converter 17 is required to provide an ability to normally perform analog conversion even when the reference voltage VREF is lowered.

However, in general, most D/A converters provided inside microcomputers are only capable of operating at reference voltage VREF down to about 1.4 V.

The reason is as follows. D/A converters use a so-called R-2R ladder system circuit to dynamically vary the reference voltage VREF. However, in D/A converters provided inside microcomputers, switches are divided into a group of only P-channel MOS transistors and a group of only N-channel MOS transistors, in order to obtain a higher degree of integration, and the P-channel MOS transistors with higher threshold cannot normally turn on when the reference voltage VREF becomes around 1.4 V.

Figure 6:
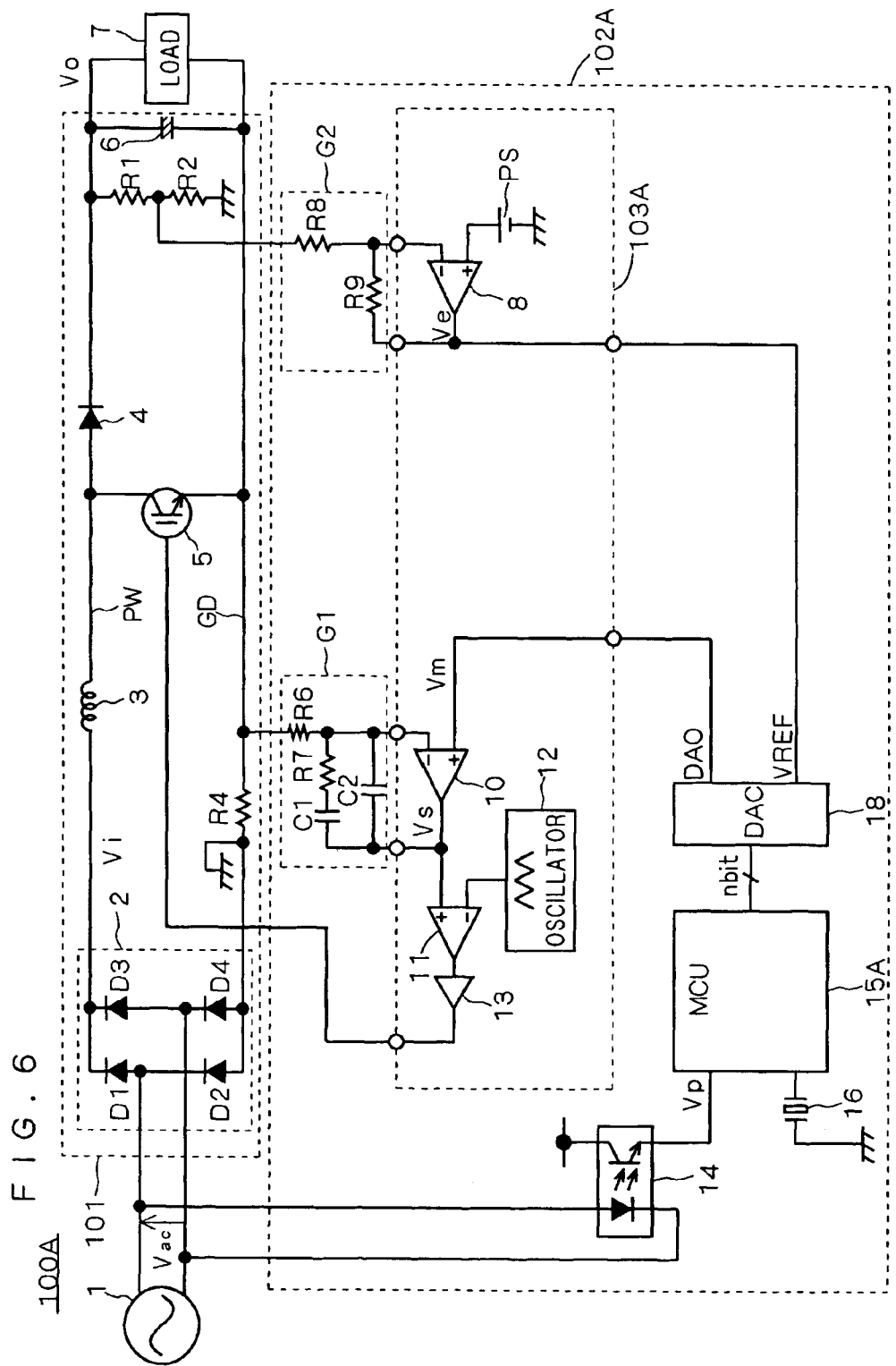
FIG. 6 is a diagram showing the configuration of a converter device according to a first modification of the first preferred embodiment of the invention.

Accordingly, as shown in FIG. 6 in a power factor improving unit 102A of the converter device 100A, a D/A converter 18 may be provided external to the microcomputer 15A that receives the output from the photocoupler 14, where the microcomputer 15A generates n-bit full-wave rectification waveform data in synchronization with digital signal Vp from the photocoupler 14 and applies it to the external D/A converter 18.

The external D/A converter 18, not severely restricted by integration degree, can be structured to be capable of operating even with reference voltage VREF at 0 V. Thus the allowable range of decrease of the reference voltage VREF can be extended. Also, this permits the use of a microcomputer having no D/A converter, which is advantageous in that various types of microcomputers can be used.

A-5. Second Modification

Figure 7:
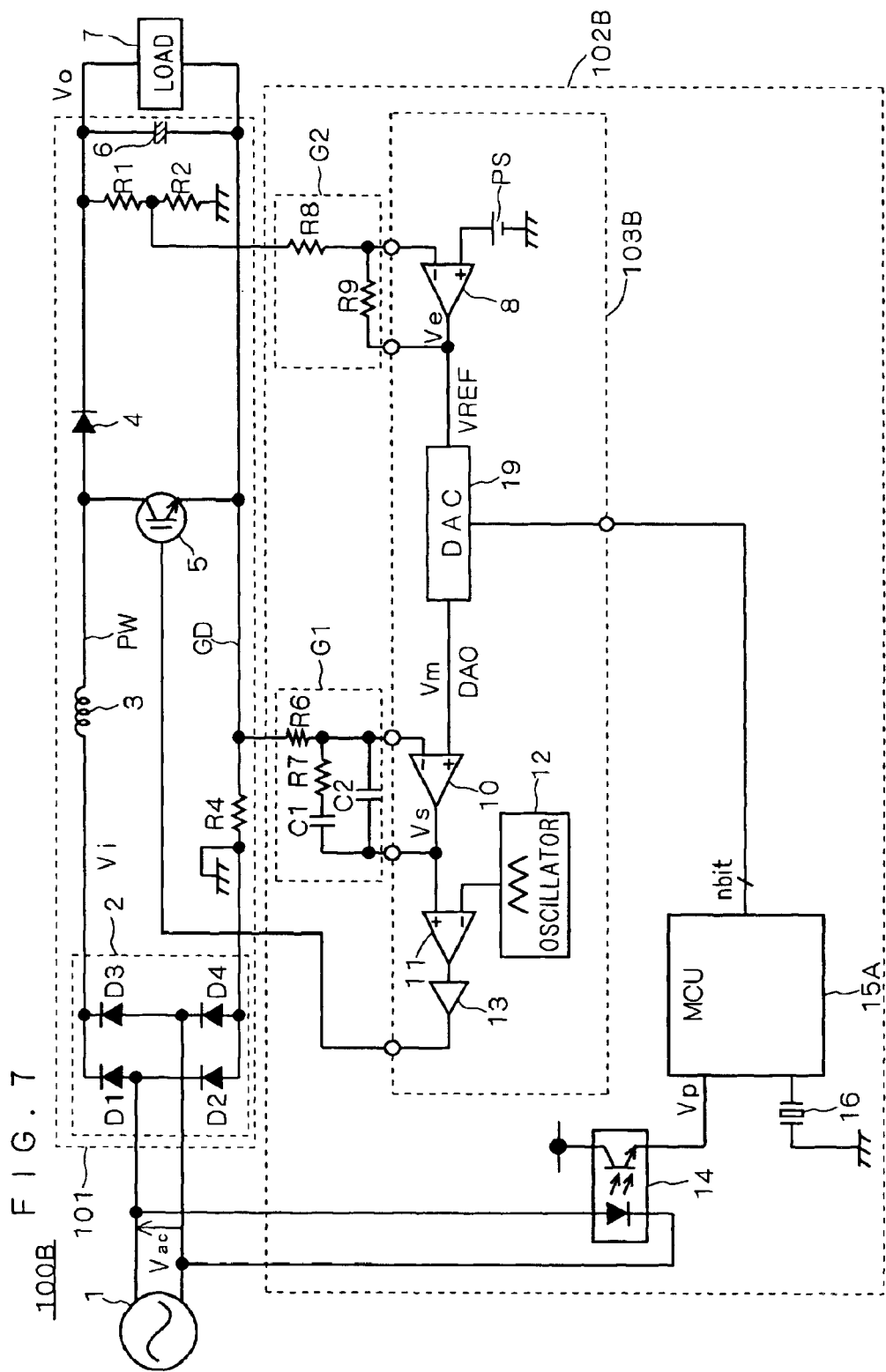
FIG. 7 is a diagram showing the configuration of a converter device according to a second modification of the first preferred embodiment of the invention.

The above-described first modification of the first preferred embodiment has shown the converter device 100A in which D/A converter 18 external to the microcomputer 15A is used to generate a target current value waveform. As for another configuration in which a D/A converter is provided outside the microcomputer 15A, as shown in FIG. 7 in a power factor improving unit 102B of the converter device 100B, a D/A converter 19 may be provided inside the power factor improving circuit 103B.

The power factor improving circuit 103B is fabricated in the form of an IC chip. Therefore providing the D/A converter 19 therein increases the chip area. However, since no external D/A converter is required, the total number of parts can be reduced in the whole system.

B. Second Preferred Embodiment

Figure 8:
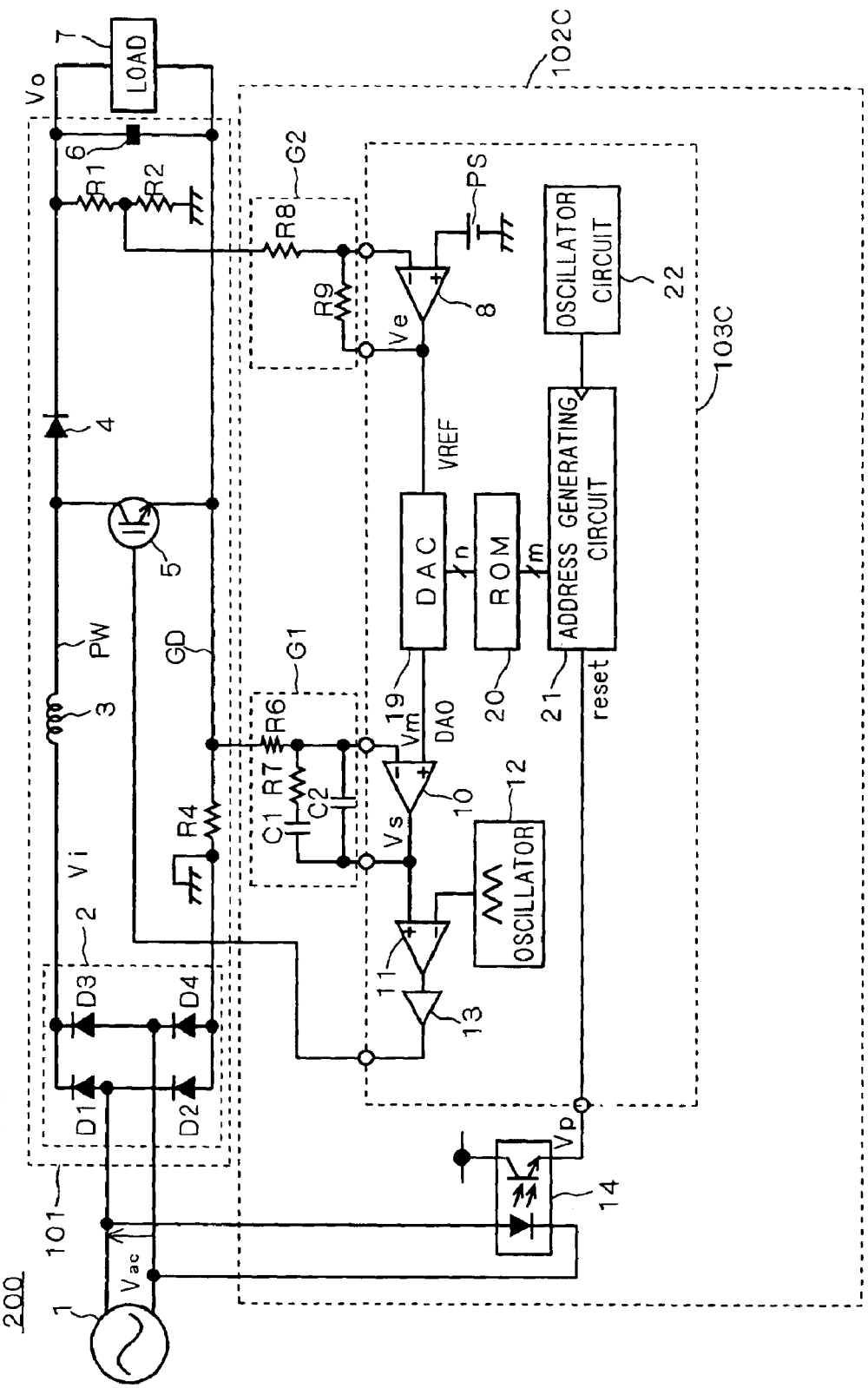
FIG. 8 is a diagram showing the configuration of a converter device according to a second preferred embodiment of the invention.

FIG. 8 shows the configuration of a converter device 200 according to a second preferred embodiment of the invention.

The first preferred embodiment and its first and second modifications require external microcomputers to generate a target current value waveform. However, as shown in FIG. 8, the power factor improving unit 102C of the converter device 200 has a power factor improving circuit 103C that contains an internal D/A converter 19 and an internal computer system corresponding to the microcomputer. The same components as those in the converter device 100 of FIG. 1 are shown at the same reference characters and are not described here again.

B-1. Configuration of the Device

That is to say, the power factor improving circuit 103C contains inside: an address generating circuit 21 receiving digital signal Vp from the photocoupler 14, for adjusting time intervals at which the digital data is inputted to the D/A converter 19 so as to adjust the cycle of the full-wave rectification waveform; a ROM (Read Only Memory) 20 connected to the address generating circuit 21 and D/A converter 19 and containing previously written source data about the full-wave rectification waveform corresponding to one period of the AC power supply 1; and an oscillator circuit 22 providing a reference clock signal to the address generating circuit 21. The ROM 20 and address generating circuit 21 correspond to the computer system mentioned above.

B-2. Operation

In the power factor improving circuit 103C structured as shown above, the address generating circuit 21 gives Address 0 to ROM 20 in synchronization with a rising signal of the digital signal Vp from the photocoupler 14. Then it counts the clock signal from the oscillator circuit 22 and outputs Address 1 when a certain time has passed after sending Address 0 (for example, after 0.361 msec has passed if the AC power supply 1 has 60 Hz cycles). If m=6 bits, it is possible to specify addresses from 0 to 63.

ROM 20, storing source data about an n-bit sinusoidal full-wave rectification waveform, for example, outputs digital data in correspondence with addresses given from the address generating circuit 21, thereby providing the D/A converter 19 with full-wave rectification waveform data synchronized with the cycle of the AC power supply 1. Then the D/A converter 19 multiplies the full-wave rectification waveform data given from the ROM 20 and the reference voltage VREF or the voltage error signal Ve from the voltage error amplifier 8, so as to provide a target current value waveform. Operation of the D/A converter 19 is the same as that of the D/A converter 17 shown in FIG. 1.

B-3. First Example of Configuration of Oscillator Circuit

Figure 9:
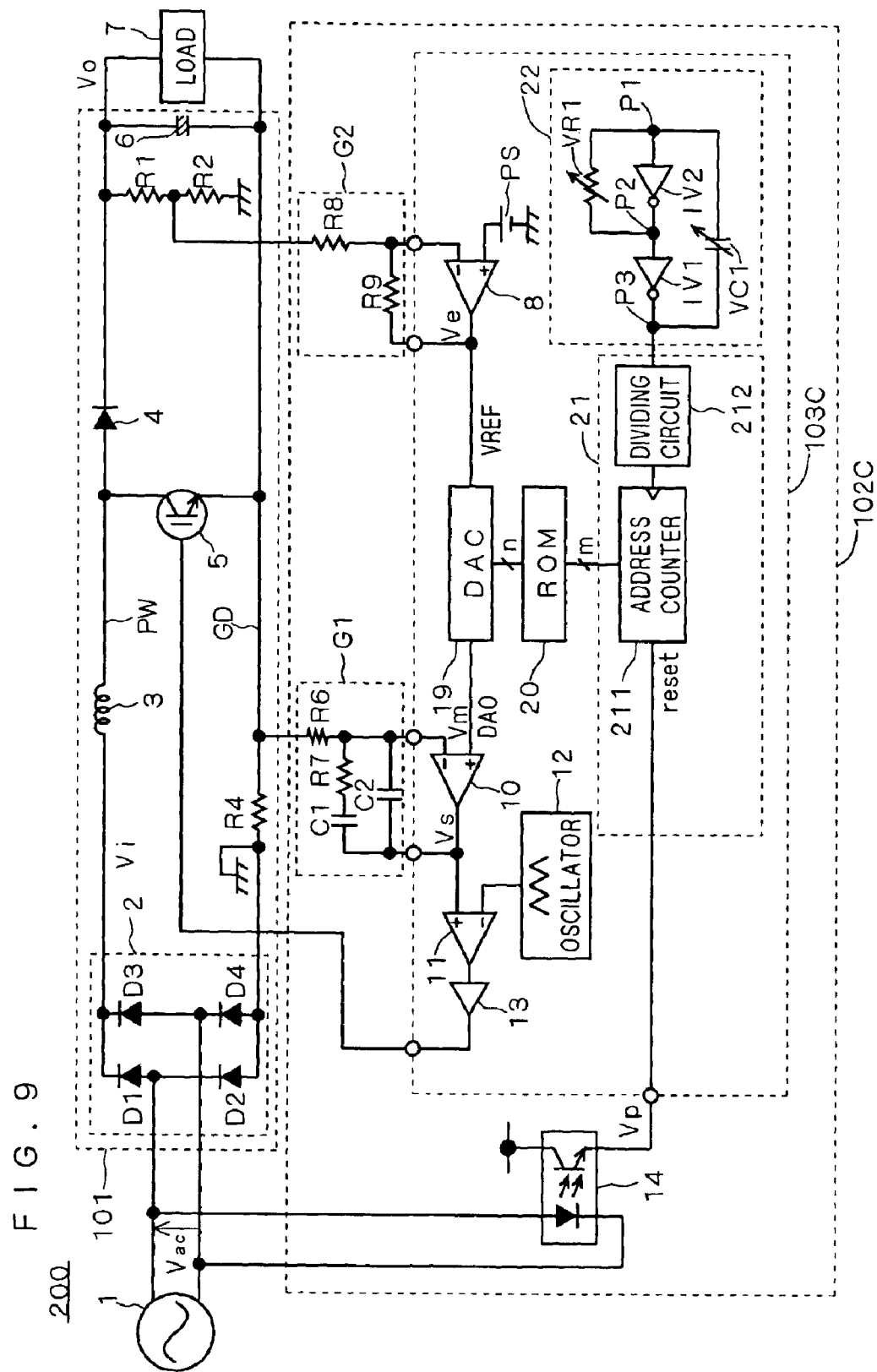
FIG. 9 is a diagram showing a configuration of the oscillator circuit in the converter device of the second preferred embodiment of the invention.

Now, a specific example of the configuration of the oscillator circuit 22 is described referring to FIG. 9. As shown in FIG. 9, the address generating circuit 21 has an address counter 211 and a frequency-dividing circuit 212, where the reference clock signal from the oscillator circuit 22 is given to the frequency-dividing circuit 212.

The oscillator circuit 22 has series-connected inverters IV1 and IV2, a variable capacitor VC1 connected in parallel to the inverters IV1 and IV2, and a variable resistor VR1 connected in parallel to the inverter IV2.

Figure 10:
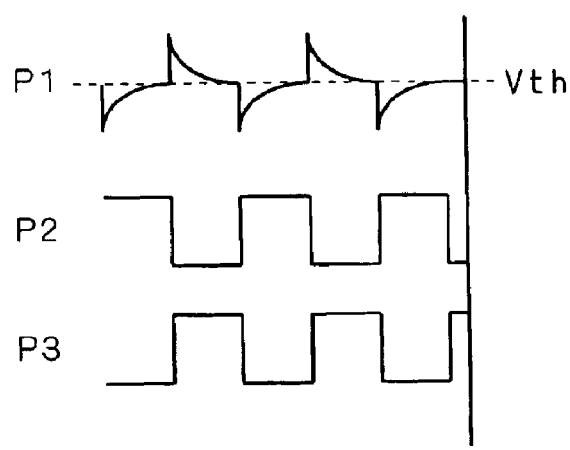
FIG. 10 is a diagram used to describe the operation of the oscillator circuit in the converter device of the second preferred embodiment of the invention.

Now the operation of the oscillator circuit 22 is described referring to FIG. 10: the connection node between the input of the inverter IV2 and the variable capacitor VC1 and variable resistor VR1 is taken as a node P1, the connection node between the output of the inverter IV2 and the variable resistor VR1 is taken as a node P2, and the connection node between the output of the inverter IV1 and the variable capacitor VC1 is taken as a node P3.

FIG. 10 shows waveforms at nodes P1, P2 and P3. When the voltage level at the node P3 is at a Low (L) level, then the voltage level at the node P2 is at a High (H) level and the variable capacitor VC1 is charged through the variable resistor VR1. When the voltage level at the node P1 reaches the threshold (Vth) of the inverters IV1 and IV2, then the voltage level at the node P3 attains an H level, and the variable capacitor VC1 is discharged through the variable resistor VR1, increasing the voltage level at the node P2. As a result, the node P3 outputs a square wave with an oscillation frequency determined by the threshold (Vth) of inverters IV1 and IV2 and the time constant of the variable capacitor VC1 and variable resistor VR1: i.e. it outputs the reference clock signal.

The reference clock signal generated in the oscillator circuit 22 is set at a frequency higher than the frequency required in the address generating circuit 22. The address generating circuit 21 requires a frequency on the order of kilohertz (kHz). Therefore it is frequency-divided in the frequency-dividing circuit 212 to a convenient frequency.

In general, resistance and capacitance values inside an IC vary ±30%. Accordingly, when an oscillator circuit is provided in an IC, the frequency of the output clock signal varies in the same way. The oscillator circuit 22 therefore uses variable resistor VR1 and variable capacitor VC1 for trimming so that the resistance and capacitance values are at given values. This suppresses the variation of the clock signal frequency and ensures accurate target current value frequency.

B-4. Second Example of Configuration of Oscillator Circuit

As stated above, when resistor and capacitor elements are provided in an IC, resistance and capacitance values vary. Therefore the resistor and capacitor elements of the oscillator circuit may be provided outside the power factor improving circuit.

Figure 11:
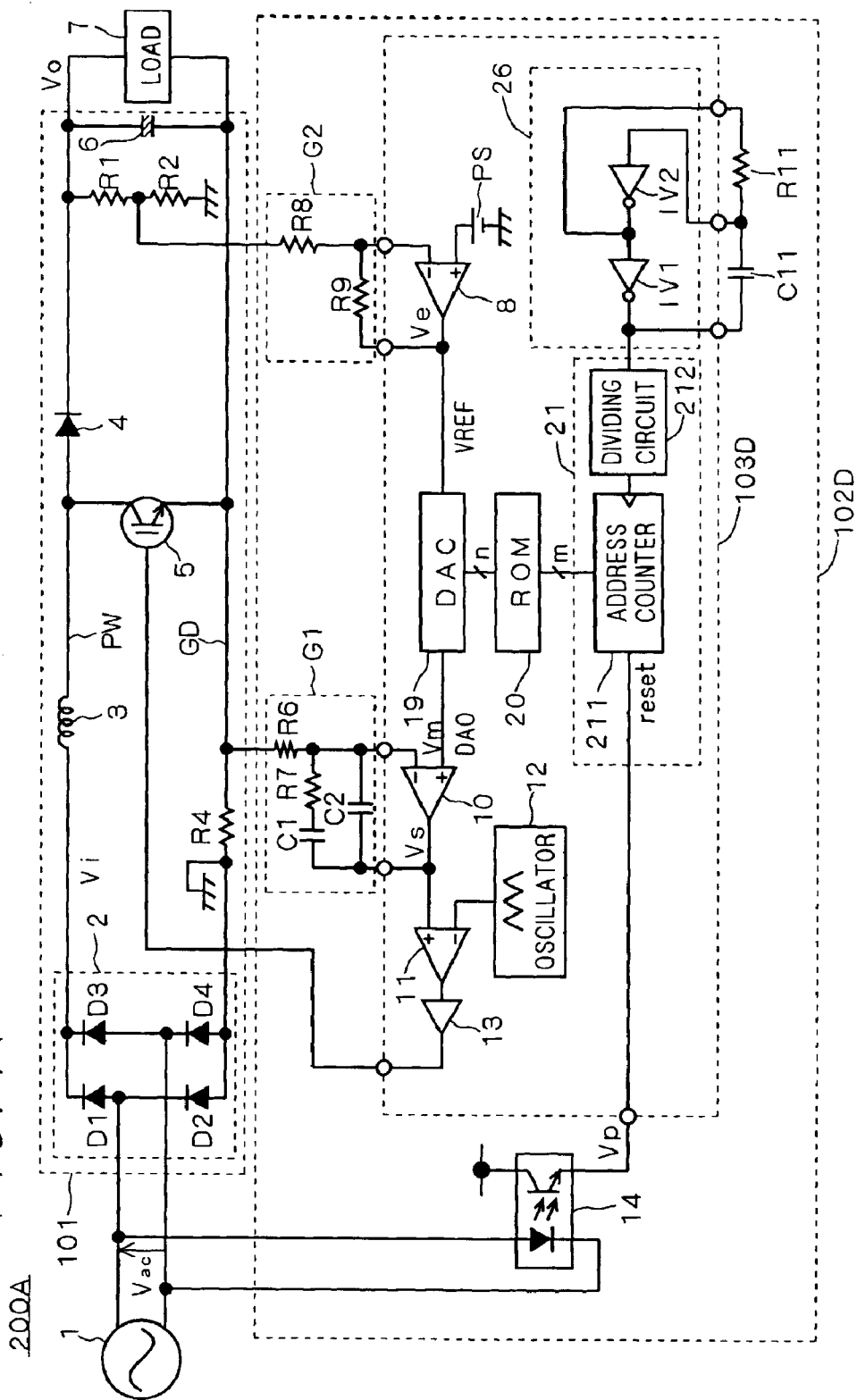
FIG. 11 is a diagram showing another configuration of the oscillator circuit of the converter device of the second preferred embodiment of the invention.

As shown in FIG. 11, in the power factor improving unit 102D of the converter device 200A, an oscillator circuit 26 inside the power factor improving circuit 103D contains inverters IV1 and IV2, but resistor R11 and capacitor C11 determining the oscillation frequency are provided outside the power factor improving circuit 103D.

Thus using external resistor R11 and capacitor C11 eliminates variations of resistance and capacitance values and ensures high frequency accuracy without requiring trimming, so that an accurate target current value waveform can be generated.

Also, the resistor R11 and capacitor C11 can be easily changed and so the oscillation frequency can be easily varied.

B-5. Effects

As described above, in the converter devices 200 and 200A, D/A converter 19 and a computer system corresponding to the microcomputer are contained in the power factor improving circuits 103C and 103D. This avoids the necessity of making a connection with an external microcomputer and reduces the total number of parts in the whole system.

Furthermore, since the oscillator circuit 22 for generating reference clock is contained inside the power factor improving circuit 103C, it is not necessary to provide an external, high-precision reference clock signal source such as a crystal oscillator or ceramic oscillator.

B-6. First Modification

Figure 12:
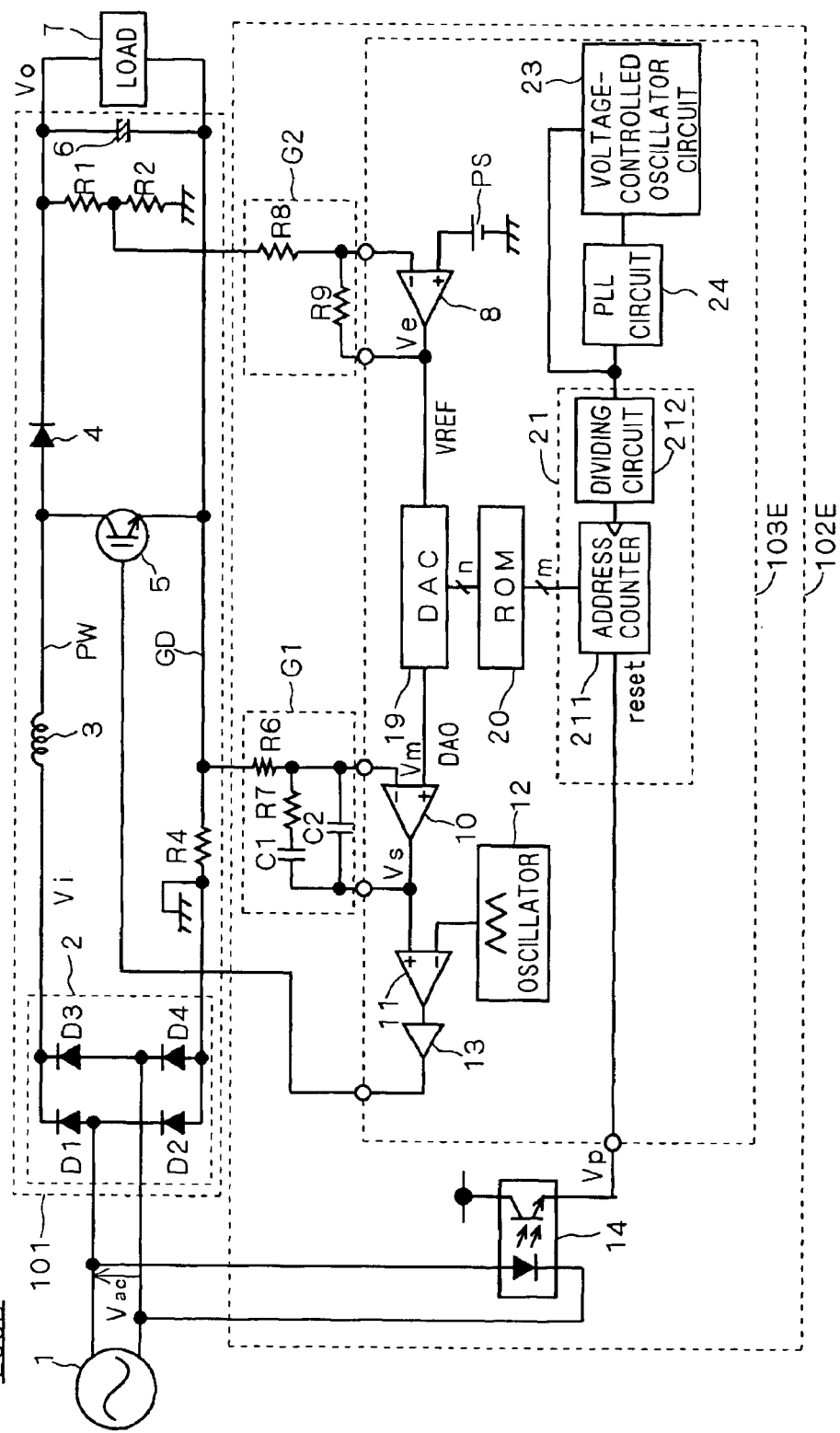
FIG. 12 is a diagram showing the configuration of a converter device according to a first modification of the second preferred embodiment of the invention.

The power factor improving circuit 103C of FIG. 8 has shown a configuration that contains oscillator circuit 22 for providing a reference clock signal for periodic signal synchronization. However, as shown in FIG. 12, in a power factor improving unit 102E of the converter device 200B, a power factor improving circuit 103E may use a voltage-controlled oscillator circuit 23 as an oscillation source, with a PLL (Phase Locked Loop) circuit 24 for locking its output, so as to ensure frequency accuracy.

The PLL circuit 24 is a circuit that detects an error between a target frequency and an output frequency and outputs it as a voltage, which is fed back to the voltage-controlled oscillator circuit 23 to ensure frequency accuracy.

For example, when the output frequency of the voltage-controlled oscillator circuit 23 is higher than the target frequency, such a voltage signal as to lower the output frequency is given to the voltage-controlled oscillator circuit 23. On the other hand, when the output frequency of the voltage-controlled oscillator circuit 23 is lower than the target frequency, such a voltage signal as to increase the output frequency is given to the voltage-controlled oscillator circuit 23.

Thus, locking the output of the voltage-controlled oscillator circuit 23 with PLL circuit 24 ensures high frequency accuracy without the need for trimming, enabling generation of an accurate target current value waveform.

B-7. Second Modification

Figure 13:
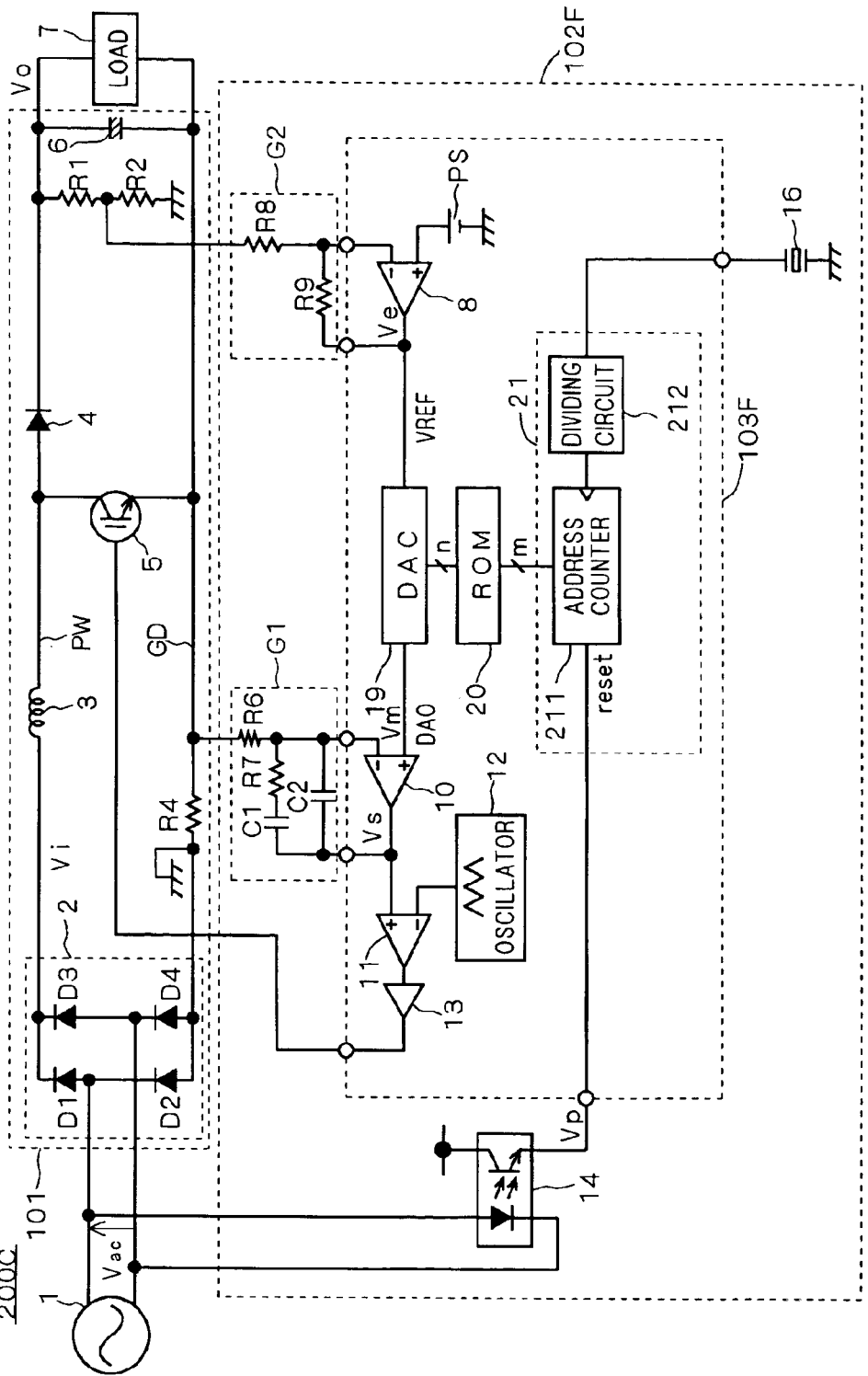
FIG. 13 is a diagram showing the configuration of a converter device according to a second modification of the second preferred embodiment of the invention.

The power factor improving circuit 103C of FIG. 8 has shown a configuration that contains oscillator circuit 22 for giving a reference clock signal for periodic signal synchronization. However, as shown in FIG. 13, in a power factor improving unit 102F of the converter device 200C, a power factor improving circuit 103F may obtain a reference clock signal from an external reference clock signal source 16.

That is to say, in the power factor improving circuit 103F, the frequency-dividing circuit 212 in the address generating circuit 21 receives a reference clock signal input from the external reference clock signal source 16.

While the frequency of the clock signal from the external reference clock signal source 16 is in the order of megahertz (MHz), the address generating circuit 21 requires frequency on the order of kilohertz (kHz). Therefore the frequency is divided at the frequency-dividing circuit 212 and converted to a convenient frequency.

The address counter 211 receives digital signal Vp from the photocoupler 14 at its reset terminal (edge trigger type) and specifies addresses in the ROM 20 storing sinusoidal full-wave rectification waveform source data, using the clock signal converted to a lower frequency at the frequency-dividing circuit 212.

In this way, providing a highly precise external reference clock signal instead of using an internal oscillator circuit simplifies the circuit configuration and enables highly accurate setting of the target current value waveform frequency.

C. Third Preferred Embodiment

The converter device 200B described referring to FIG. 12 has shown a configuration in which the output from voltage-controlled oscillator circuit 23 is locked by PLL circuit 24. However, this configuration, using feedback control, requires a time before the frequency becomes stabilized (lock-in time), and also requires complicated designing to enhance the stability of oscillation.

Figure 14:
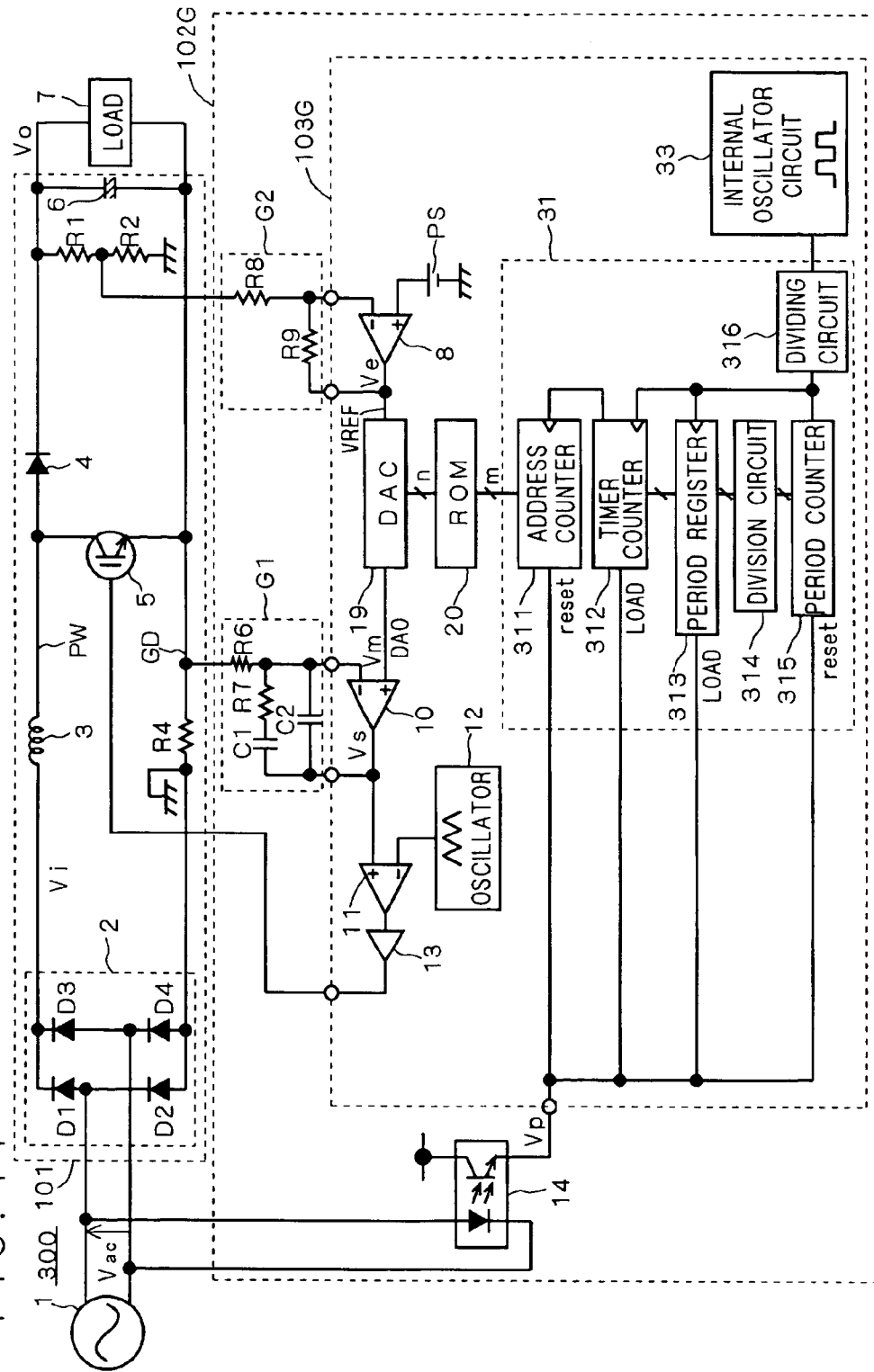
FIG. 14 is a diagram showing the configuration of a converter device according to a third preferred embodiment of the invention.

Therefore a third preferred embodiment of the invention shows, in FIG. 14, the configuration of a converter device 300 that is capable of ensuring high frequency accuracy of the target current value without using feedback control. The same components as those in the converter device 200 of FIG. 9 are shown at the same reference characters and are not described here again.

C-1. Configuration of the Device

As shown in FIG. 14, in the power factor improving unit 102G of the converter device 300, a power factor improving circuit 103G contains an internal oscillator circuit 33 for giving a reference clock signal and an address generating circuit 31 including an address counter 311, a timer counter 312, a period register 313, a division circuit 314, a period counter 315, and a frequency-dividing circuit 316.

The reference clock signal generated at the internal oscillator circuit 33 is given to the frequency-dividing circuit 316 and frequency-divided in the frequency-dividing circuit 316. Then it is given to the timer counter 312, period register 313, and period counter 315.

The output of the period counter 315 is provided to the division circuit 314, the output of the division circuit 314 is provided to the period register 313, the output of the period register 313 is provided to the timer counter 312, the output of the timer counter 312 is provided to the address counter 311, and the output of the address counter 311 is provided to the ROM 20.

Also, the digital signal Vp outputted from the photocoupler 14 is provided to the address counter 311, timer counter 312, period register 313, and period counter 315.

Figure 15:
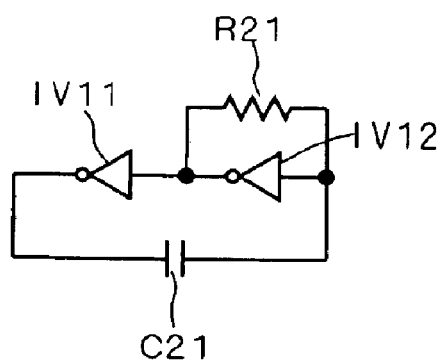
FIG. 15 is a diagram showing the configuration of the oscillator circuit in the converter device of the third preferred embodiment of the invention.

FIG. 15 shows the configuration of the internal oscillator circuit 33. The internal oscillator circuit 33 has series-connected inverters IV11 and IV12, a capacitor C21 connected in parallel to the inverters IV11 and IV12, and a resistor R21 connected parallel to the inverter IV12.

C-2. Operation

The operation of the power factor improving circuit 103G, mainly the operation of the address generating circuit 31, is now described below.

The period counter 315 measures one period of the AC power supply 1, i.e. the time from a rise of digital signal Vp from the photocoupler 14 to the next rise, using the reference clock signal from the internal oscillator circuit 33.

Now, when one period of the AC power supply 1 is taken as T[s] and the frequency of the reference clock signal from the internal oscillator circuit 33 (internal oscillation frequency) is taken as f[Hz], then the count value K1 about the power-supply period is given as K1=T×f.

The count value K1 is given to the division circuit 314 and the division circuit 314 divides it by the number of data, nd, of the full-wave rectification waveform source data stored in the ROM 20 to provide a divided value K1' (K1'=K1/nd). The divided value K1' corresponds to a period of increment of the address to be provided to the ROM 20.

Then, the timer counter 312 counts the divided value K1' using the reference clock signal from the internal oscillator circuit 33; then the count period T' is given as T'=(K1'/f)= {(T×f/nd)/f}=T/nd.

In this way, independently of the internal oscillation frequency f, the address generating circuit 31 correctly divides the period of the AC power supply 1 into periods of increment of addresses to be given to the ROM 20.

The timer counter 312 sets the initial value at K1', counts it down with the internal oscillation frequency f, outputs a pulse to the address counter 311 when the count reaches 0, and reloads the divided value K1' stored in the period register 313.

C-3. Effects

In the converter device 300, as described above, the address generating circuit 31 contained in the power factor improving circuit 103G can correctly divide the period of the AC power supply 1 into periods of increment of addresses to be given to the ROM 20, independently of the internal oscillation frequency f of the internal oscillator circuit 33. It is therefore possible to provide target current value with a highly accurate frequency without using feedback control, which enhances system stability.

Also, even when the frequency of the AC power supply 1 has been varied, the cycle of increment of the address counter 311 is automatically varied. It is thus possible to deal with AC power supplies with various cycles without a need for circuit modification.

Furthermore, using the division circuit 314 makes it possible to deal with any value of data number, nd.

C-4. First Modification

Figure 16:
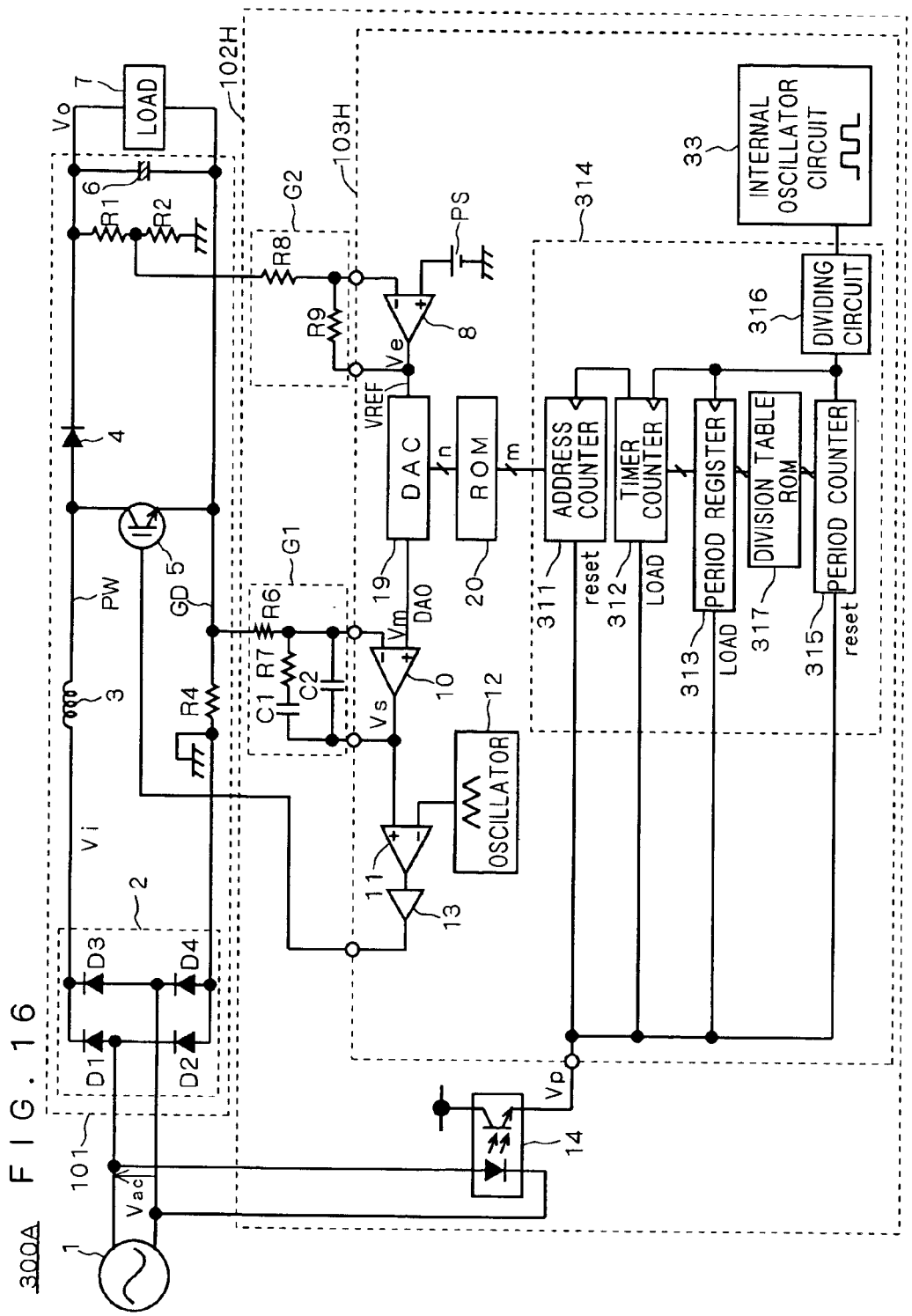
FIG. 16 is a diagram showing the configuration of a converter device according to a first modification of the third preferred embodiment of the invention.

In the address generating circuit 31 in the converter device 300 of FIG. 14, the period counter 315 measures one period (T) of the AC power supply and the division circuit 314 divides it by the number of data, nd, of the full-wave rectification waveform source data stored in the ROM 20 to provide divided value K1' (K1'=K1/nd). On the other hand, as shown in FIG. 16 as a power factor improving unit 102H of the converter device 300A, an address generating circuit 314 in the power factor improving circuit 103H obtains divided value K1' using a division table ROM 317 in which results of given division are written in advance.

That is to say, in correspondence with addresses ADd in the ROM 317, data about results of ADd/nd division is previously written as output data in the division table ROM 317.

Then, the division table ROM 317 is accessed, with the power-supply period count value K1 used as Address ADd, and it outputs the value of K1/nd, or divided value K1'. The division function is thus realized as a result.

Figure 17:
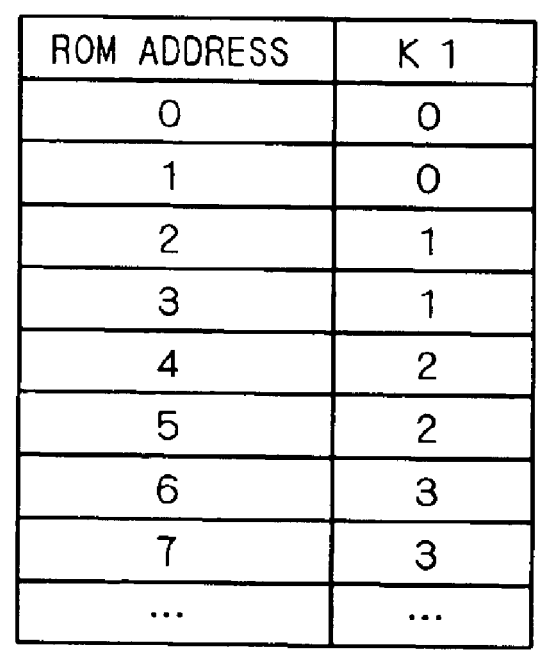

This operation is further described referring to FIG. 17. FIG. 17 shows an example of a division table written in the division table ROM 317, where output data is shown in correspondence with addresses in ROM 317.

In the table, quotients obtained by dividing addresses are described as output data, assuming that the data number, nd, of the fill-wave rectification waveform data is 2, for example.

For instance, with Address 7, 7÷2=3 with a remainder of 1, and the output data is 3. Thus, when the period counter 315 counts the power-supply period count value K1 to provide 7, then Address 7 in the division table ROM 317 is specified, and the division table ROM 317 outputs 3 as divided value K1'.

The address generating circuit 31A in the power factor improving circuit 103H thus realizes the division by using a ROM table. This eliminates the need for a circuit having a division function and therefore simplifies the configuration. Also, the number of data of the full-wave rectification waveform generated can be arbitrarily determined, which increases design freedom.

C-5. Second Modification

Figure 18:
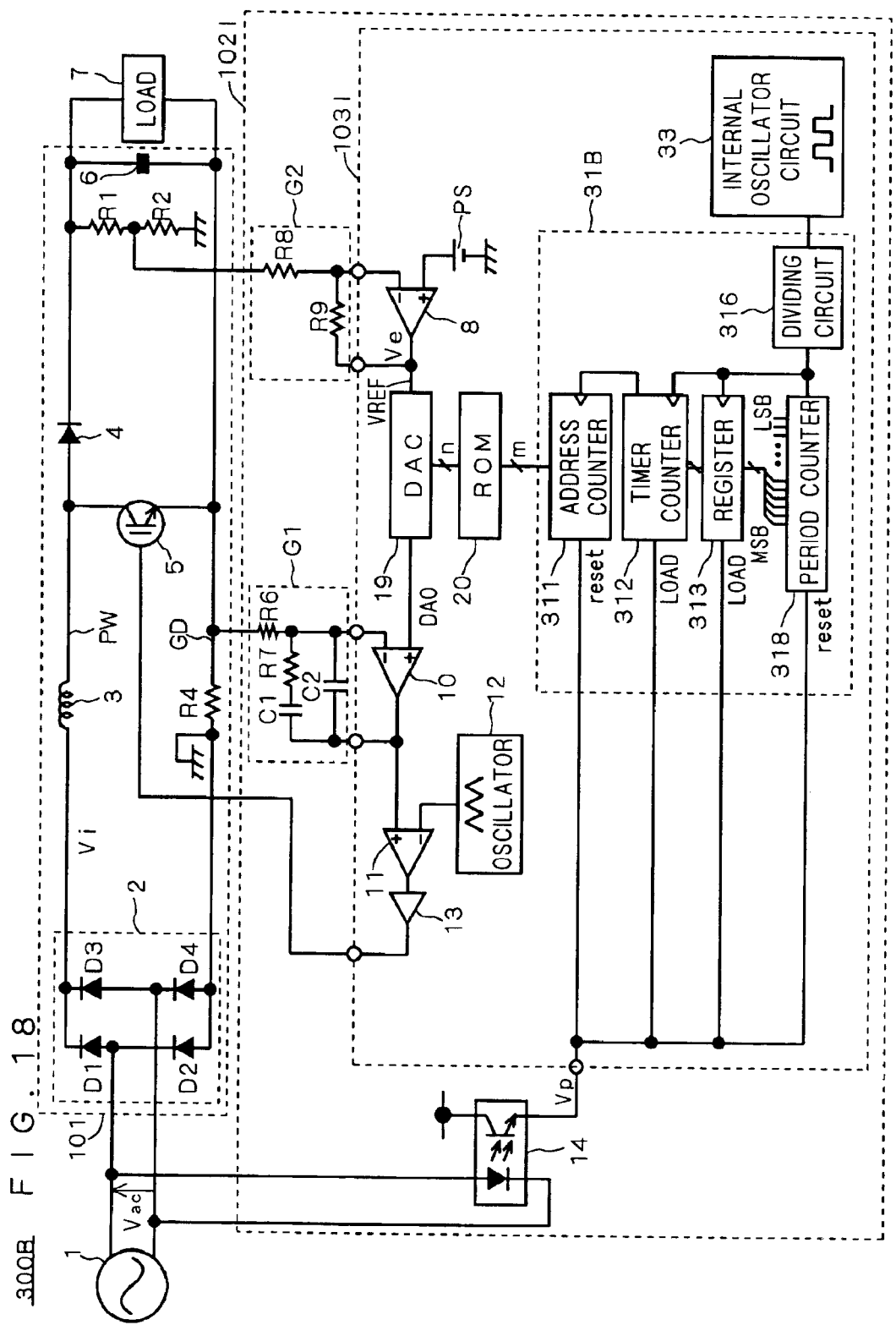
FIG. 18 is a diagram showing the configuration of a converter device according to a second modification of the third preferred embodiment of the invention.

As for a configuration for realizing the division function without using a circuit having division function, as shown in FIG. 18, in the power factor improving unit 102I of the converter device 300B, a power factor improving circuit 103I may contain a period counter having a bit shift function in the address generating circuit 31B.

That is to say, in the address generating circuit 31B, a period counter 318 for measuring one period of AC power supply 1, i.e. the time from a rise of digital signal Vp from the photocoupler 14 to the next rise, has a bit shift function. Divided value K1' can be obtained by the bit shift.

This operation is now further described referring to FIG. 19. FIG. 19 is a diagram schematically showing the bit shift function of the period counter 318. FIG. 19 shows results obtained when data represented as 112 in decimal notation is shifted (right-shifted) toward the LSB (Least Significant Bit) one bit at a time.

As shown in FIG. 19, when data decimally represented as 112 is shifted one bit to the right, the result is 56, and when it is further right-shifted one bit, then the result is 28. Thus right-shifting data for X bits results in a value divided by $2^X$. Therefore, when the data number nd of the full-wave rectification waveform data is 2, the divided value K1' can be obtained by one-bit right-shifting the power-supply period count value K1 measured by the period counter 318.

The divided value K1' thus obtained is given to the period register 313.

Thus, divided value K1' can be obtained from the power-supply period count value K1 by using the bit shift function of the period counter 318. This eliminates the need for a circuit having a division function and simplifies the configuration. Also, since the divided value K1' obtained by bit shifting uses higher order bits in the period counter 318, only the data of higher order bits is given to the period register 313. Therefore period register 313 with a smaller storage capacity can be used to reduce circuit size.

While the invention has been described in detail, the foregoing description is in all aspects illustrative and not restrictive. It is understood that numerous other modifications and variations can be devised without departing from the scope of the invention.

What is claimed is:

1. A converter device having an A/D converter unit for converting AC power to DC power and a power factor improving unit for improving a power factor of said A/D converter unit, wherein said power factor improving unit comprises, a photocoupler for converting an AC power-supply waveform given to said A/D converter unit into a digital signal and outputting said digital signal, a computer system for generating full-wave rectification waveform data synchronized with said AC power-supply waveform on the basis of said digital signal, a D/A converter receiving as a reference voltage a voltage error signal based on a voltage error between a predetermined set voltage and an output voltage of said A/D converter unit, for multiplying together said reference voltage and said full-wave rectification waveform data to output a target current value waveform similar to the waveform of an input voltage in said A/D converter unit, and a current control portion for comparing said target current value waveform and a waveform of a current flowing in said A/D converter unit and controlling said current flowing in said A/D converter unit to reduce a current error between the two.

2. The converter device according to claim 1, wherein a voltage error signal generating portion for generating said voltage error signal and said current control portion are provided inside an IC chip as a power factor improving circuit, and said D/A converter and said computer system are provided outside said IC chip.

3. The converter device according to claim 2, wherein said D/A converter is provided inside said computer system.

4. The converter device according to claim 2, wherein said D/A converter is provided outside said computer system.

5. The converter device according to claim 1, wherein said D/A converter, a voltage error signal generating portion for generating said voltage error signal, and said current control portion are provided inside an IC chip as a power factor improving circuit and said computer system is provided outside said IC chip.

6. The converter device according to claim 1, wherein said D/A converter, said computer system, a voltage error signal generating portion for generating said voltage error signal, and said current control portion are provided inside an IC chip as a power factor improving circuit.

7. The converter device according to claim 6, wherein said computer system comprises:

a storage device in which source data about a full-wave rectification waveform for one period of said AC power-supply waveform is written as digital data; and an address generating circuit receiving said digital signal outputted from said photocoupler, for outputting an address signal with a given timing and thereby adjusting time intervals at which said digital data written in said storage device is inputted to said D/A converter, and wherein said address generating circuit adjusts said time intervals to establish synchronization with a cycle of said AC power-supply waveform, and said storage device outputs said full-wave rectification waveform source data in correspondence with said address signal given from said address generating circuit so as to provide to said D/A converter said full-wave rectification waveform data synchronized with said AC power-supply waveform.

8. The converter device according to claim 7, wherein said power factor improving circuit contains in said IC chip an oscillation circuit for giving a reference clock signal to said address generating circuit.

9. The converter device according to claim 8, wherein said oscillation circuit has a variable resistor and a variable capacitor as a resistance component and a capacitance component determining its oscillation frequency.

10. The converter device according to claim 8, wherein said oscillation circuit has, outside said IC chip, a resistance component and a capacitance component determining its oscillation frequency.

11. The converter device according to claim 8, wherein said oscillation circuit is a voltage-controlled oscillator circuit, and said power factor improving circuit further contains, inside said IC chip, a PLL circuit for locking an output of said voltage-controlled oscillator circuit and giving the output to said address generating circuit.

12. The converter device according to claim 8, wherein said address generating circuit comprises:

a frequency-dividing circuit for frequency-dividing said reference clock signal; and an address counter for counting said reference clock signal converted to a lower frequency by said frequency-dividing circuit to determine the timing of output of said address signal.

13. The converter device according to claim 7, wherein said power factor improving circuit obtains, from outside of said IC chip, a reference clock signal to be given to said address generating circuit.

14. The converter device according to claim 13, wherein said address generating circuit comprises:

a frequency-dividing circuit for frequency-dividing said reference clock signal; and an address counter for counting said reference clock signal converted to a lower frequency by said frequency-dividing circuit to determine the timing of output of said address signal.

15. The converter device according to claim 7, wherein said address generating circuit comprises:

a frequency-dividing circuit for frequency-dividing said reference clock signal;

a period counter receiving said digital signal outputted from said photocoupler, for counting a count value for one period of said AC power supply on the basis of said reference clock signal converted to a lower frequency by said frequency-dividing circuit;

division means for dividing said count value by the number of data of said full-wave rectification waveform source data to obtain a divided value corresponding to a period of increment of an address in said storage device;

a register for storing said divided value;

a timer counter for counting said divided value on the basis of said reference clock signal converted to the lower frequency by said frequency-dividing circuit; and an address counter for determining the timing of output of said address signal on the basis of said divided value.

16. The converter device according to claim 15, wherein said division means is a division circuit.

17. The converter device according to claim 15, wherein said division means is a storage device for storing results of division in which results of a predetermined division are previously written.

18. The converter device according to claim 15, wherein said division means includes said period counter and obtains said divided value by bit-shifting a result counted by said period counter.

* * * * *